US012528097B2

(12) United States Patent
Choe et al.

(10) Patent No.: US 12,528,097 B2
(45) Date of Patent: Jan. 20, 2026

(54) PUMP ASSEMBLY

(71) Applicant: YONWOO CO., LTD., Incheon (KR)

(72) Inventors: Seong Ung Choe, Incheon (KR); Tae Yong Kim, Incheon (KR)

(73) Assignee: YONWOO CO., LTD., Incheon (KR)

( * ) Notice: Subject to any disclaimer, the term of this patent is extended or adjusted under 35 U.S.C. 154(b) by 219 days.

(21) Appl. No.: 18/280,264

(22) PCT Filed: Dec. 20, 2021

(86) PCT No.: PCT/KR2021/019407
§ 371 (c)(1),
(2) Date: Sep. 4, 2023

(87) PCT Pub. No.: WO2022/186457
PCT Pub. Date: Sep. 9, 2022

(65) Prior Publication Data

US 2024/0066539 A1 Feb. 29, 2024

(30) Foreign Application Priority Data

Mar. 2, 2021 (KR) ........................ 10-2021-0027267

(51) Int. Cl.
*B05B 11/10* (2023.01)

(52) U.S. Cl.
CPC ........ *B05B 11/105* (2023.01); *B05B 11/1077* (2023.01); *B05B 11/1001* (2023.01)

(58) Field of Classification Search
CPC ............... B05B 11/105; B05B 11/1077; B05B 11/1001; B05B 11/1047; B05B 11/0044;
(Continued)

(56) References Cited

U.S. PATENT DOCUMENTS 4,053,089 A * 10/1977 Gamadia ............... F04B 53/129 222/321.2
4,911,336 A * 3/1990 Blake ..................... B65D 83/48 222/402.1
(Continued)

FOREIGN PATENT DOCUMENTS

KR 20-0306872 Y1 3/2003
KR 10-1332169 B1 11/2013
(Continued)

*Primary Examiner* — Hoang M Nguyen
(74) *Attorney, Agent, or Firm* — Bridgeway IP Law Group, PLLC; Sang Ho Lee; Hyun Woo Shin

(57) ABSTRACT

A pump assembly includes a cylinder open on top and bottom thereof and having a hollow portion formed therein and a first wing protruding outward from the outer peripheral surface of top thereof, a sealing part having at least a portion thereof inserted into the cylinder to at least partly seal the upper peripheral surface of the cylinder and a second wing protruding outward from the outer peripheral surface of the top thereof, a stem moving downward in reply to an external force to vary internal pressure of the cylinder, an elastic member disposed between the stem and the sealing part to apply an elastic force to the stem from the sealing part, and a housing coupled to the cylinder in such a way to surround the outer peripheral surface of the upper portion of the cylinder and adapted to detachably couple the pump assembly to a container.

8 Claims, 8 Drawing Sheets

(58) Field of Classification Search
CPC ............. B05B 11/1069; B05B 11/1074; B05B 11/1023; B05B 11/1067; C08L 101/00; F04B 9/14
See application file for complete search history.

(56) References Cited

U.S. PATENT DOCUMENTS

| | | | | |
|---|---|---|---|---|
| 5,285,998 | A * | 2/1994 | Zink | F16K 27/07 137/454.6 |
| 11,224,888 | B2 * | 1/2022 | Kang | B05B 11/1023 |
| 2006/0237483 | A1 * | 10/2006 | Ophardt | B05B 11/1066 222/207 |

FOREIGN PATENT DOCUMENTS

| | | | |
|---|---|---|---|
| KR | 20-2013-0007474 | U | 12/2013 |
| KR | 10-2019-0042264 | A | 4/2019 |
| KR | 10-2186042 | B1 | 12/2020 |
| KR | 10-2271374 | B1 | 6/2021 |

* cited by examiner (a) (b)

PUMP ASSEMBLY

TECHNICAL FIELD

The present invention relates to a pump assembly, more specifically to a pump assembly that is capable of having an eco-friendly elastic member.

BACKGROUND ART

Generally, a pump container is configured to discharge contents thereof to the outside through a pumping operation of a pump assembly coupled to top of a body, and accordingly, the pump container includes the body in which the contents thereof are stored, the pump assembly coupled to top of the body in such a way as to create a vacuum in the interior of the body and thus suck and move up the contents by means of the pumping operation, and a button part located on top of the pump assembly in such a way as to be ascended and descended according to a user's pressurization and thus transfer a pressure to the pump assembly.

In this case, the pump assembly serves to perform the pumping operation so that the contents stored in the body are discharged to the outside, and to perform such repeated pumping operations, the pump assembly has a spring disposed therein to apply an elastic force. Typically, the spring is made of a metal, thereby raising a manufacturing cost of the pump assembly, and besides, the pump assembly is made of plastic and metal materials as different types of materials, so that the metal spring is separated from the plastic components and then thrown away so as to recycle the pump assembly, thereby making it difficult to perform the recycling of the pump assembly.

DISCLOSURE

Technical Problem

Accordingly, the present invention has been made in view of the above-mentioned problems occurring in the related art, and it is an object of the present invention to provide a pump assembly that is capable of having an eco-friendly elastic member, while improving coupling forces among the components thereof.

The technical problems to be achieved through the present invention are not limited as mentioned above, and other technical problems not mentioned herein will be obviously understood by one of ordinary skill in the art through the following description.

Technical Solution

To accomplish the above-mentioned objects, according to the present invention, a pump assembly is provided. The pump assembly may include: a cylinder open on top and bottom thereof and having a hollow portion formed therein and a first wing protruding outward from the outer peripheral surface of top thereof; a sealing part having at least a portion thereof inserted into the cylinder to at least partly seal the upper portion of the cylinder and a second wing protruding outward from the outer peripheral surface of the top thereof; a stem moving downward by means of an external force to vary internal pressure of the cylinder; an elastic member disposed between the stem and the sealing part to apply an elastic force to the stem from the sealing part; and a housing coupled to the cylinder in such a way to surround top of the cylinder and adapted to detachably couple the pump assembly to a container, wherein if the housing is coupled to the container, the first wing and the second wing are pressurized downward by the inner surface of the housing and thus fixed to top of the container.

Further, the cylinder may have a seating groove formed on the inner periphery of top end thereof to accommodate the second wing therein so that top of the first wing is aligned in height with top of the second wing.

Furthermore, the housing may include: an accommodation portion open on top and bottom thereof and having a hollow portion formed therein to accommodate at least portions of the stem and the elastic member therein; a side peripheral wall disposed spaced apart from the accommodation portion in an outward direction and having a coupling portion formed on the inner peripheral surface thereof in such a way as to be detachably coupled to the container; and a connection portion extending outward from the outer peripheral surface of the accommodation portion to connect the side peripheral wall and the accommodation portion, whereby the accommodation portion is inserted into the sealing part by a given depth to couple the housing to the sealing part.

Further, the sealing part may have a first peripheral portion protruding upward from the underside of the inside thereof and a first coupling protrusion protruding from the outer peripheral surface of the first peripheral portion, and the housing may have a second coupling protrusion protruding from the inner peripheral surface of the underside of the accommodation portion, whereby if the accommodation portion is inserted into the sealing part, the first coupling protrusion may be fastened to the second coupling protrusion.

Furthermore, the sealing part may have at least one or more first air inlet holes formed on the underside of the inside thereof on the outside of the first peripheral portion in such a way as to communicate with the interior of the cylinder.

Moreover, the elastic member may be a bellows type member closed on the side peripheral surface thereof, and the stem may have a second peripheral portion protruding outward from the outer peripheral surface of the upper portion thereof to support top of the elastic member, the second peripheral portion having at least one or more air entrance holes formed thereon in such a way as to communicate with the open top of the elastic member.

Besides, the second peripheral portion may have a downward extending portion protruding downward from the outer periphery thereof to prevent top of the elastic member from being deformed outward.

Additionally, the accommodation portion may extend upward up to a height corresponding to the second peripheral portion to accommodate the elastic member therein, without any exposure of the elastic member to the outside.

Further, the elastic member may be made of at least one selected from polyetheretherketone (PEEK), polycarbonate (PC), polyoxymethylene (POM), polyketone (POK), polybutylene terephthalate (PBT), polypropylene (PP), polyethylene (PE), polyoxypropylene (POP), elastomer, polyolefin elastomer (POE), copolymer, and ethylene octene/butene copolymers.

Advantageous Effects of Invention

According to the present invention, the pump assembly includes the elastic member made of soft plastic and simple in configuration, thereby reducing the manufacturing cost thereof and solving the separation and waste problem of the elastic member from other components upon the recycling thereof.

According to the present invention, further, the pump assembly is configured to allow the housing to pressurize the wings formed on the cylinder and the sealing part and thus fix them to top of the body of the container in such a way as to prevent the cylinder and the sealing part from escaping therefrom, so that the pump assembly is more stably coupled to the body of the container.

According to the present invention, furthermore, the pump assembly is configured to allow the accommodation portion of the housing to come into close contact with the inner peripheral surface of the sealing part, while being insertedly coupled to the inner peripheral surface of the lower end portion thereof, thereby improving the coupling force between the housing and the sealing part.

According to the present invention, besides, the pump assembly is configured to prevent the elastic member from being exposed to the outside by means of the housing, so that while the pump assembly is being kept at a given place or is being coupled to the body of the container, the elastic member is avoided from being broken.

BRIEF DESCRIPTION OF DRAWINGS

To allow the drawings as will be mentioned in the description of the present invention to be more sufficiently understood, the brief description of the drawings may be provided.

MODE FOR INVENTION

Figure 1:
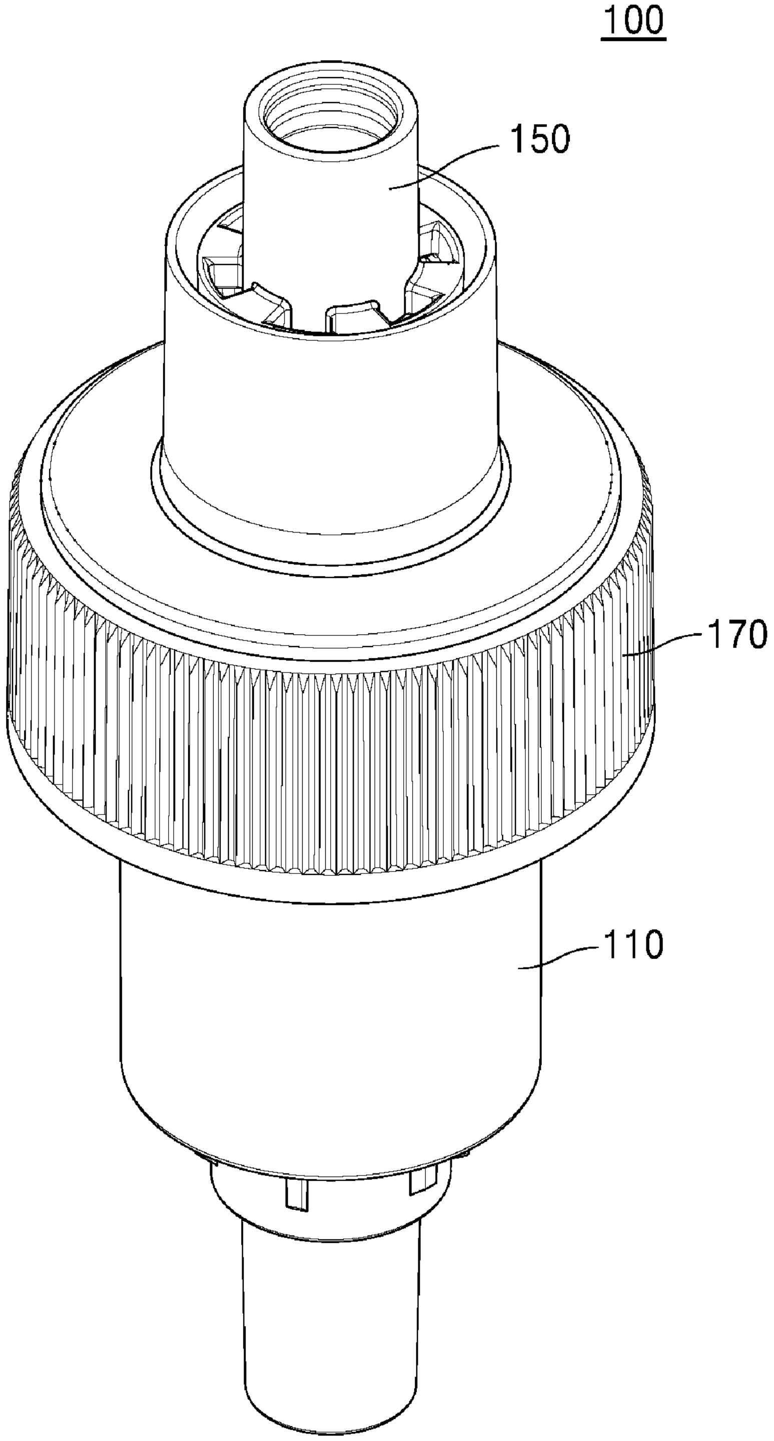
FIG. 1 is a perspective view showing a pump assembly according to the present invention.

Hereinafter, example embodiments will be described with reference to the accompanying drawings. In addition, a device of the present invention and a method for using the device will be explained in detail with reference to the attached drawings. In the drawings, the same reference numerals or symbols are parts or components performing the same functions. Further, top, bottom, left and right directions as will be described below are determined with reference to the drawings, and accordingly, the scope of the present invention is not necessarily restricted to the corresponding directions.

Terms, such as the first, the second, A, and B, may be used to describe various elements, but the elements should not be restricted by the terms. The terms are used to only distinguish one element from the other element. For example, a first element may be named a second element without departing from the scope of the present invention. Likewise, a second element may be named a first element. A term 'and/or' includes a combination of a plurality of relevant and described items or any one of a plurality of related and described items.

Terms used in this application are used to only describe specific exemplary embodiments and are not intended to restrict the present invention. An expression referencing a singular value additionally refers to a corresponding expression of the plural number, unless explicitly limited otherwise by the context. In this application, terms, such as "comprise", "include", or 'have", are intended to designate those characteristics, numbers, steps, operations, elements, or parts which are described in the specification, or any combination of them that exist, and it should be understood that they do not preclude the possibility of the existence or possible addition of one or more additional characteristics, numbers, steps, operations, elements, or parts, or combinations thereof.

In the description, when it is said that one element is described as being "connected" to the other element, one element may be directly connected or coupled to the other element, but it should be understood that another element may be present between the two elements. When it is said that one portion is described as "includes" any component, further, one element may further include other components unless no specific description is suggested.

Figure 2:
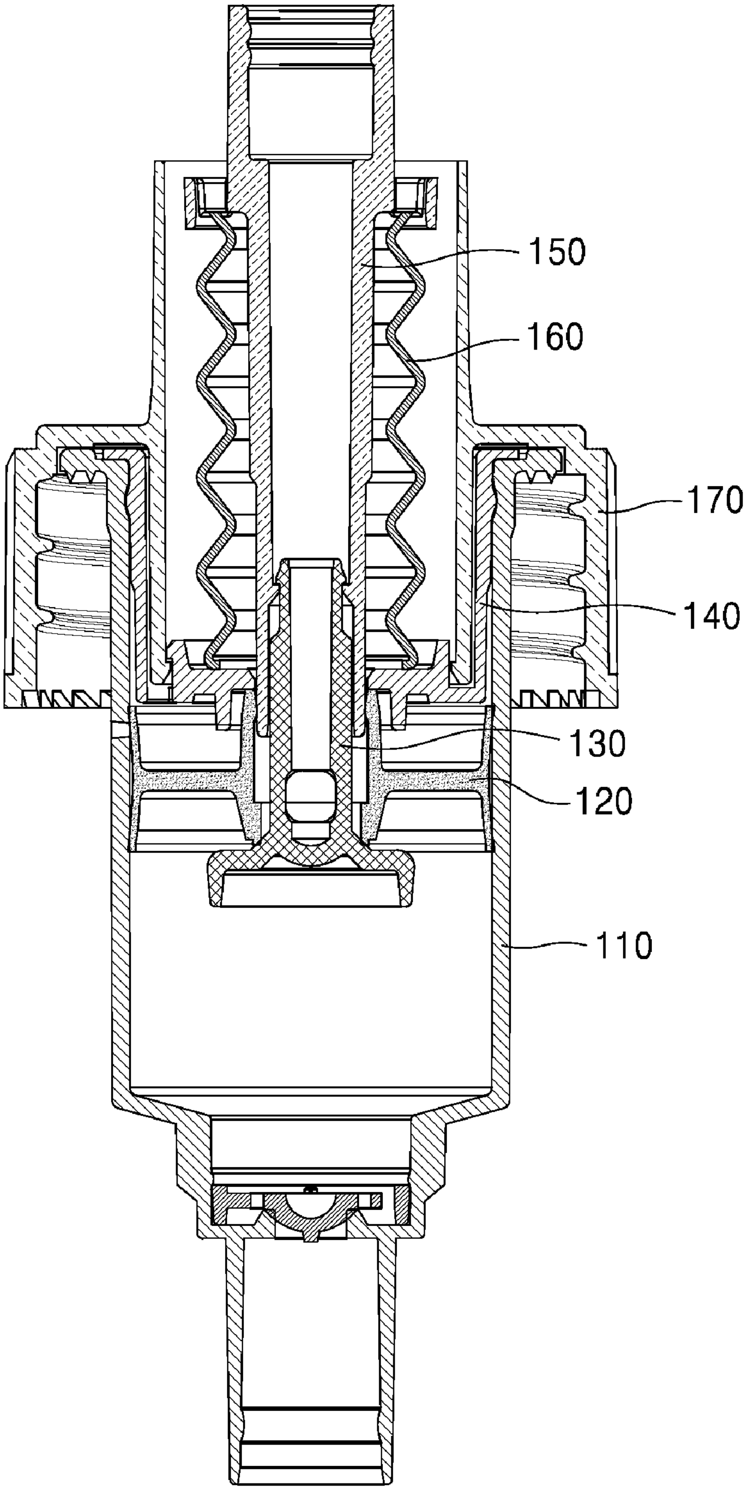
FIG. 2 is a sectional view showing the pump assembly according to the present invention.
Figure 3:
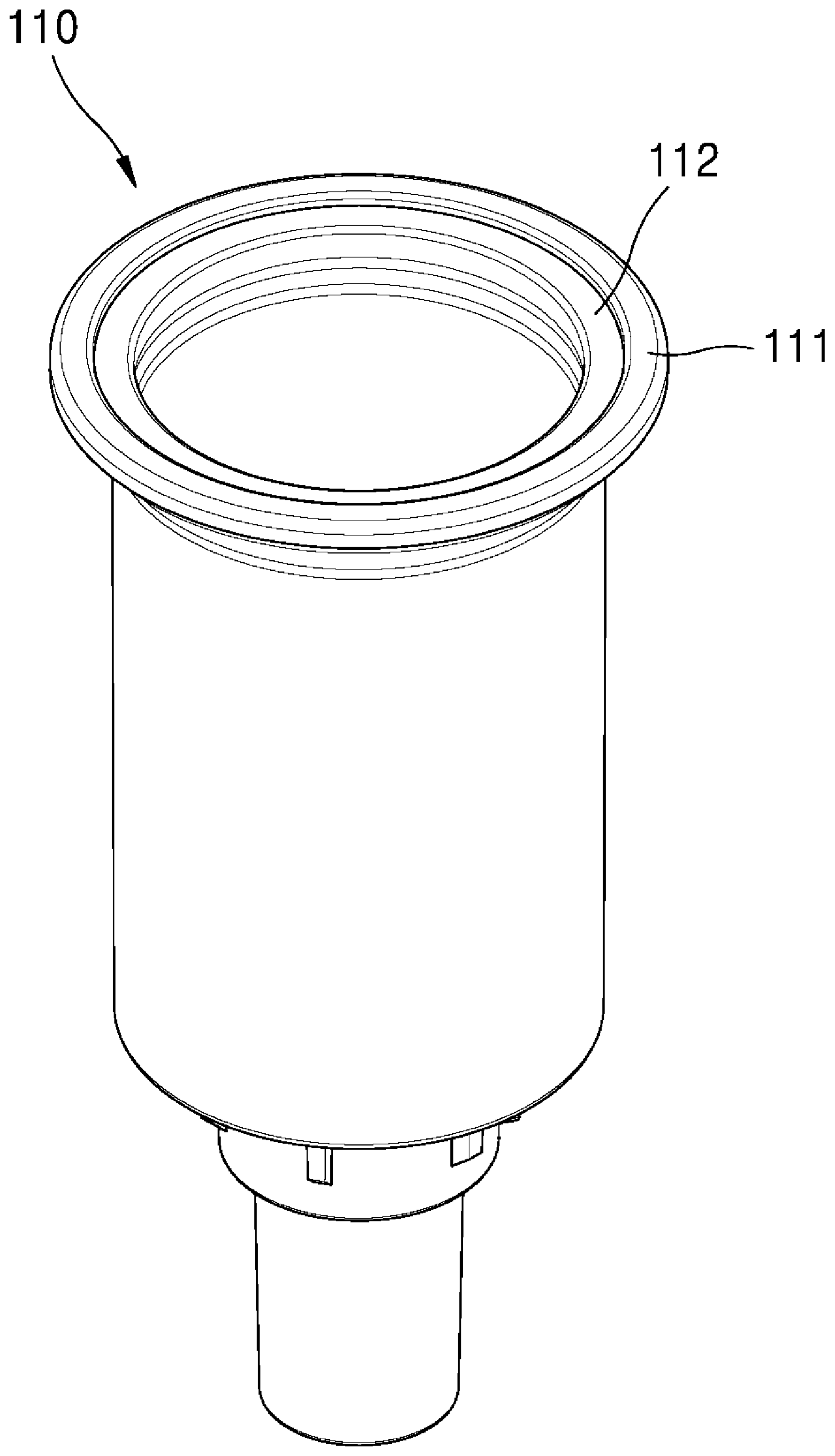
FIG. 3 shows a cylinder of the pump assembly according to the present invention.
Figure 4:
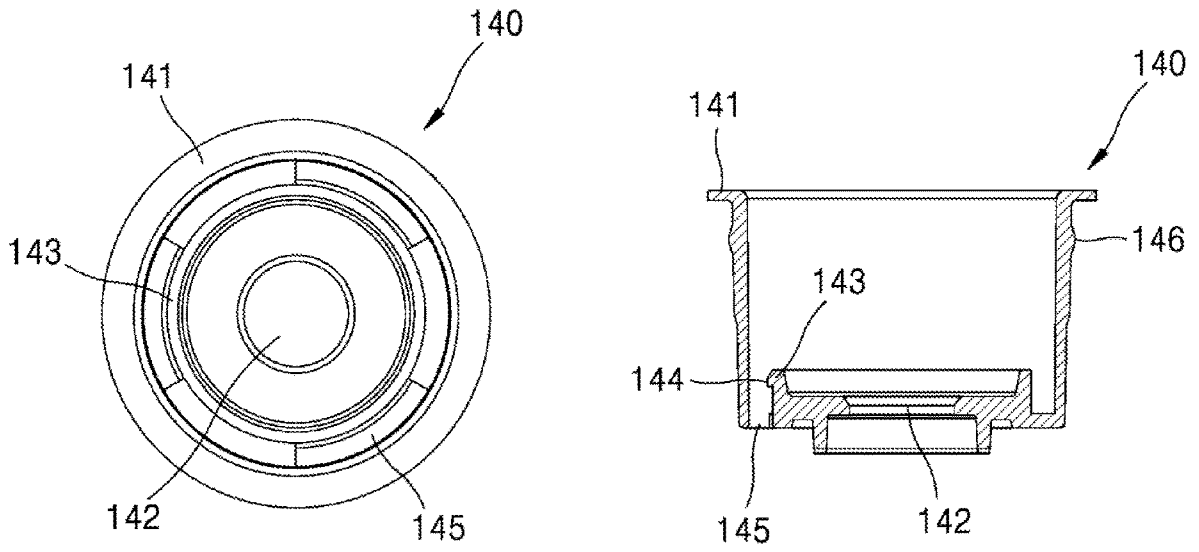
FIG. 4 shows a sealing part of the pump assembly according to the present invention.
Figure 5:
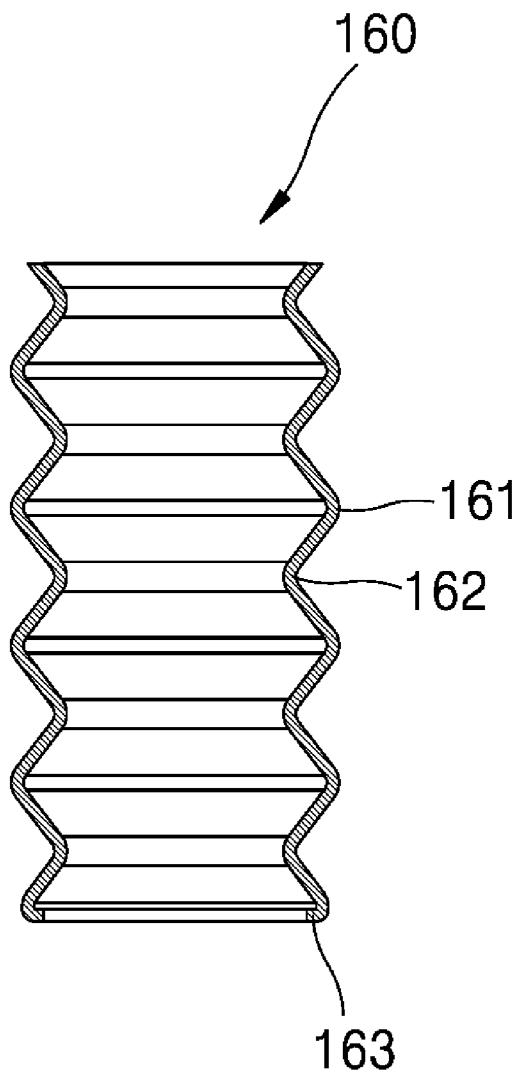
FIG. 5 shows a stem of the pump assembly according to the present invention.
Figure 6:
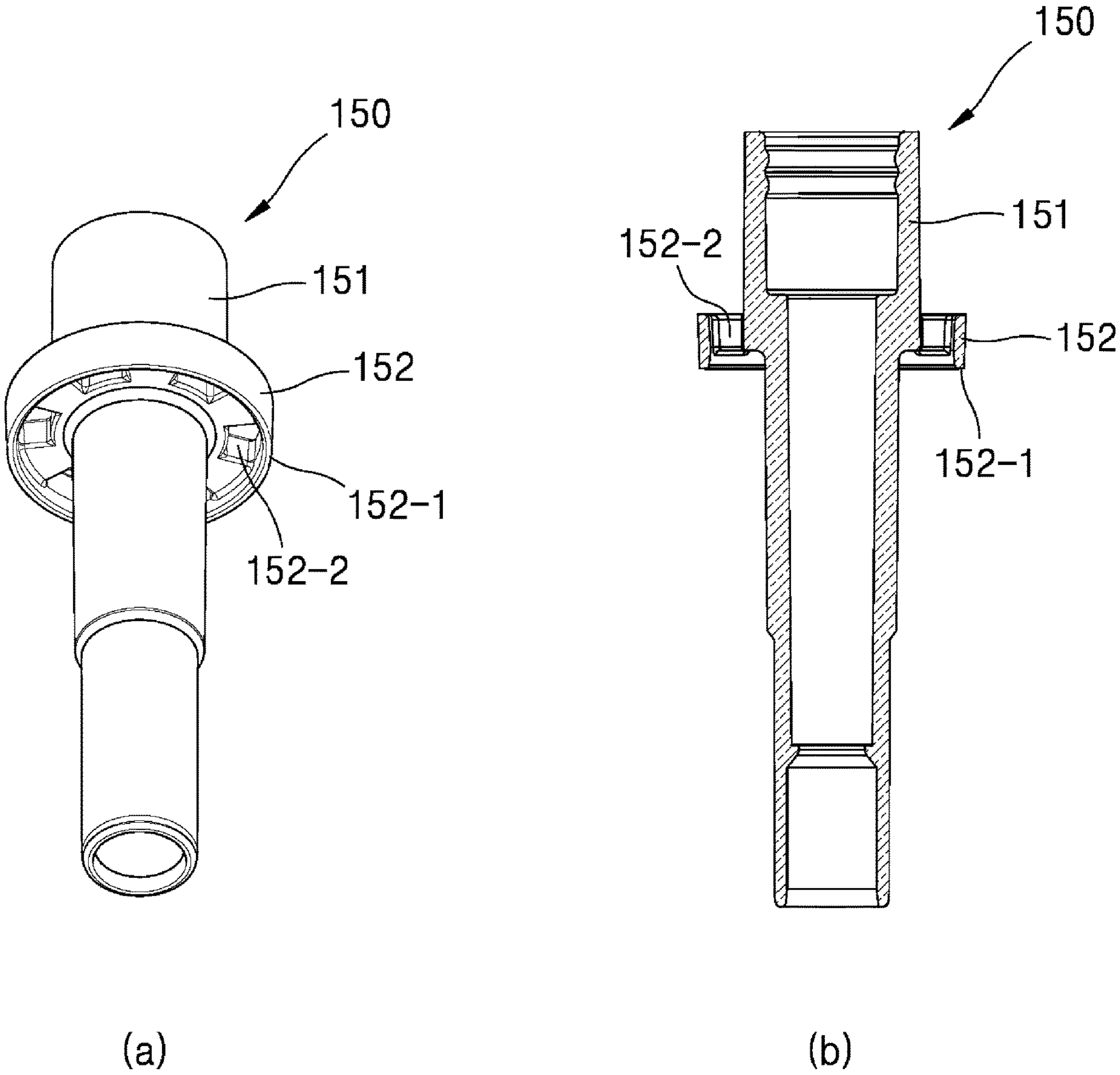
FIG. 6 shows an elastic member of the pump assembly according to the present invention.
Figure 7:
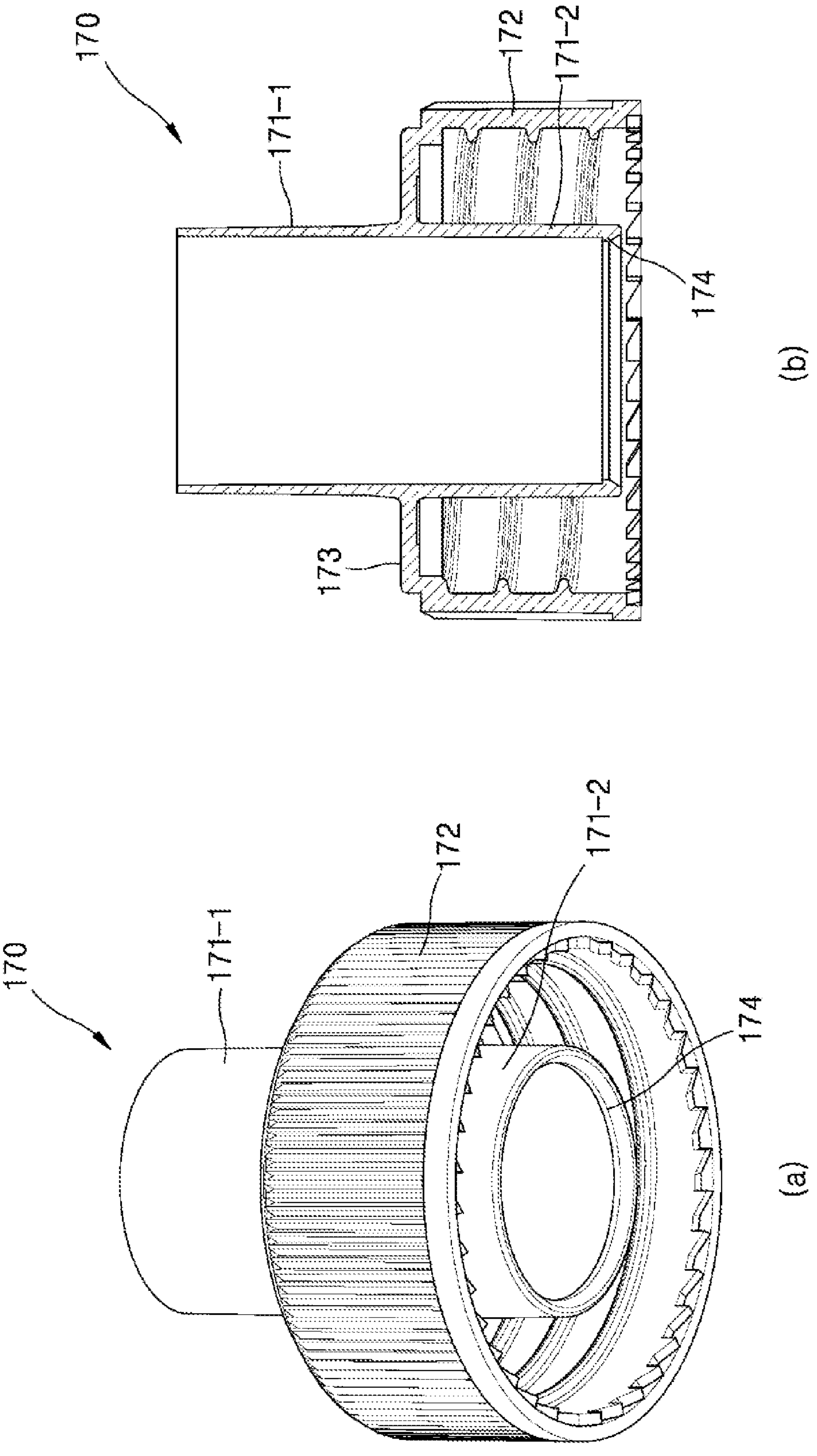
FIG. 7 shows a housing of the pump assembly according to the present invention.

FIG. 1 is a perspective view showing a pump assembly according to the present invention, FIG. 2 is a sectional view showing the pump assembly according to the present invention, FIG. 3 is a perspective view showing a cylinder of the pump assembly according to the present invention, FIG. 4 shows top and sectional views showing a sealing part of the pump assembly according to the present invention, FIG. 5 is a sectional view showing a stem of the pump assembly according to the present invention, FIG. 6 shows perspective and sectional views showing an elastic member of the pump assembly according to the present invention, and FIG. 7 shows perspective and sectional views showing a housing of the pump assembly according to the present invention.

Referring to FIGS. 1 to 7, a pump assembly 100 according to the present invention, which receives an external force from a user, is changed in internal pressure thereof, and thus sucks and discharges the contents stored in a container, includes a cylinder 110, a seal cap 120, a piston rod 130, a sealing part 140, a stem 150, an elastic member 160, and a housing 170.

The cylinder 110 is open on top and bottom thereof and has a hollow portion formed therein to provide a space to or from which the contents of the container are sucked and discharged. The cylinder 110 is located inside top (particularly, a mouth) of the container (not shown) and has a first wing 111 seated onto top of the container. For example, the first wing 111 protrudes outward from the outer peripheral surface of top of the cylinder 110, and if the cylinder is inserted into the container through the open mouth of the container, the first wing 111 is seated onto top end periphery of the mouth of the container.

The cylinder 110 has a seating groove 112 concavely formed on top end periphery thereof to seat (or accommodate) a second wing 141 of the sealing part 140 as will be discussed later thereonto. The seating groove 112 is concavely formed on the inner periphery of top of the cylinder 110 and has the shape of a loop corresponding to the second wing 141. According to the present invention, the seating groove 112 extends from the inner peripheral surface of the cylinder 110 up to a given region of the second wing 141.

The cylinder 110 extends downward toward the interior of the container and thus has an inlet communicating with the container. A valve is located on the inlet or close to the inlet. The valve is a backflow prevention valve that closes the inlet when the internal pressure of the cylinder 110 is a positive pressure and opens the inlet when the internal pressure of the cylinder 110 is changed into a negative pressure.

The seal cap 120 serves to open and close the piston rod 130, and the outer peripheral surface of the seal cap 120 comes into close contact with the inner peripheral surface of the cylinder 110, while the inner peripheral surface thereof is coming close contact with the piston rod 130. The underside of the inner peripheral surface of the seal cap 120 comes into close contact with the base portion of the piston rod 130 to seal the inlet of the piston rod 130, and if the piston rod 130 is descended with respect to the seal cap 120, the underside of the seal cap 120 becomes distant from the base portion of the piston rod 130 to open the inlet of the piston rod 130, so that the piston rod 130 communicates with the interior of the cylinder 110.

The piston rod 130 is disposed inside the cylinder 110 in such a way as to allow the outer peripheral surface of the lower portion thereof to be surrounded with the seal cap 120 and to allow the outer peripheral surface of the upper portion thereof to be connected to the stem 150. The piston rod 130 has the shape of a hollow pipe and is configured to have the inlet formed on the underside thereof in such a way as to be open and closed by the seal cap 120 and an outlet formed on top thereof in such a way as to discharge the contents introduced from the inlet therethrough. Further, the piston rod 130 has the base portion formed on the underside thereof, and if the underside of the inside of the seal cap 120 comes into close contact with the base portion, the inlet is closed with respect to the internal space of the cylinder 110.

The piston rod 130 moves vertically in the cylinder 110 by means of the stem 150. If the piston rod 130 moves downward, the underside of the inside of the seal cap 120 is distant from the base portion to open the inlet so that the contents of the cylinder 110 are introduced into the piston rod 130. If the piston rod 130 keeps moving, the contents of the cylinder 110 are discharged to the outlet, pass through the stem 150, and are finally emitted through a discharge hole. If the piston rod 130 moves upward, the cylinder 110 closes the inlet of the piston rod 130, and accordingly, the negative pressure is generated in the cylinder 110, so that the contents of the container are introduced into the cylinder 110.

The sealing part 140 is coupled to top end periphery of the cylinder 110 in such a way as to allow at least a portion thereof to be inserted into the cylinder 110 to at least partly seal the upper portion of the cylinder 110. For example, the sealing part 140 includes a side peripheral wall coming into close contact with the inner peripheral surface of the cylinder 110 and a base portion formed inside the underside of the side peripheral wall. The upward movement of the seal cap 120 is suppressed by means of the underside (or a protrusion protruding from the underside) of the base portion.

The sealing part 140 has the second wing 141 formed on top end periphery thereof. For example, the second wing 141 protrudes outward from the outer peripheral surface of top of the side peripheral wall of the sealing part 140. The second wing 141 is exposed to the outside, when the sealing part 140 is coupled to the cylinder 110, and thus accommodated in the seating groove formed on top of the cylinder 110. If the second wing 141 is accommodated in the seating groove 112, top of the second wing 141 is aligned in height with top of the first wing 111 of the cylinder 110. To do this, the second wing 141 has a thickness corresponding to the concave depth of the seating groove 112 in upward and downward directions.

The sealing part 140 has a through hole 142 and a first peripheral portion 143 formed on the underside of the inside thereof. For example, the through hole 142 is formed at the center of the base portion. The stem 150 and the piston rod 130 are coupled to each other after passing through the through hole 142. Further, for example, the first peripheral portion 143 surrounds the through hole 142, while being spaced apart from the through hole 142, and protrudes upward from top of the base portion by a given length. As a result, the underside of the elastic member 160 is located between the through hole 142 and the first peripheral portion 143 in such a way as to be supported against the top of the base portion. In this case, the first peripheral portion 143 serves to prevent the elastic member 160 from escaping therefrom and suppress the underside of the elastic member 160 from being deformed outward because of repeated use. The sealing part has at least one first coupling protrusion 144 protruding from the outer peripheral surface of the first peripheral portion 143 to couple the housing 170 thereto.

According to the present invention, the sealing part 140 has at least one or more first air inlet holes 145 formed on the underside of the inside thereof. For example, the first air inlet holes pass through the base portion and are formed on the outside of the first peripheral portion 143. The first air inlet holes 145 communicate with the interior of the cylinder 110 to allow air to be introduced and discharged into and from the space above the seal cap 120.

According to the present invention, the sealing part 140 has at least one or more coupling protrusions 146 formed on the outer peripheral surface thereof. For example, the coupling protrusions 146 protrude outward from the outer peripheral surface of the sealing part 140. Through the coupling protrusions 146, the sealing part 140 is rigidly coupled to the cylinder and more tightly seals the inner peripheral surface of the upper portion of the cylinder 110. According to the present invention, the cylinder 110 has coupling grooves formed on the inner peripheral surface thereof to correspond to the coupling protrusions 146.

The stem 150 is coupled to the piston rod 130 and thus ascended and descended together with the piston rod 130. For example, if an external force is applied through a nozzle, the stem 150 is descended to allow the piston rod 130 to be descended, and if the external force is removed, the stem 150 is ascended to allow the piston rod 130 to be ascended. Through the ascending and descending operations of the stem 150, the internal pressure of the cylinder 110 is changed.

The stem 150 includes a body 151 and a second peripheral portion 152.

The body 151 is open on top and bottom thereof to move the contents introduced from the piston rod 130 upward therethrough, and to do this, the body 151 is configured to allow the inner peripheral surface of the lower portion thereof to be coupled to the piston rod 130.

The second peripheral portion 152 protrudes outward from the outer peripheral surface of the upper portion of the body 151. Top of the elastic member 160 is supported against the underside of the second peripheral portion 152. A length of the accommodation space of the elastic member 160 is defined by a length between the underside of the second peripheral portion and the top of the base portion of the sealing part 140. In this case, the length between the underside of the second peripheral portion 152 and the top of the base portion of the sealing part 140 is shorter than the length of the elastic member 160. That is, the elastic member 160 is compressed to a shorter length than a length thereof in a steady state and thus accommodated in the pump assembly 100.

According to the present invention, the second peripheral portion 152 has a downward extending portion 152-1 formed on the outer periphery thereof. For example, the downward extending portion 152-1 protrudes downward from the outer periphery of the second peripheral portion 152 by a given length. Through the downward extending portion 152-1, the elastic member 160 is prevented from escaping from the second peripheral portion 152, and further, excessive outward deformation of the elastic member 160 according to the repeated use of the pump assembly 100 is suppressed.

According to the present invention, the second peripheral portion 152 has at least one or more air entrance holes 152-2 formed thereon. For example, the air entrance holes 152-2 penetrate the second peripheral portion 152 in upward and downward directions. If the elastic member 160 is a bellows type member, the air entrance holes 152-2 communicate with the open top of the elastic member 160, so that the compression and expansion of the internal air generated upon the compression and release of the elastic member 160 are removed by means of the air entrance holes 152-2.

The elastic member 160 is compressed and released from the compression in a longitudinal direction thereof, thereby exerting its elastic force. The elastic member 160 allows the pumping operation of the pump assembly 100 to be performed using the elastic force thereof, and accordingly, the pump assembly 100 sucks and discharges the contents of the container through the pumping operation.

The elastic member 160 is configured to allow the underside thereof to be supported against the sealing part 140 (for example, top of the base portion) and to allow the top thereof to be supported against the stem 150 (for example, the second peripheral portion 152). If the pump assembly 100 (especially the stem 150) is pressurized by the user, the stem 150 moves down to cause the elastic member 160 to be compressed. In this case, the piston rod 130 coupled to the stem 150 moves down together with the stem 150. If the pressurization is released by the user, further, the elastic force of the elastic member 160 allows the stem 150 to move up. In this case, the piston rod 130 coupled to the stem 150 moves up together with the stem 150.

According to the present invention, the elastic member 160 is the bellows type member open on top and bottom thereof and closed on the side peripheral surface thereof. In specific, the elastic member 160 has a plurality of crests 161 protruding outward therefrom and a plurality of roots 162 concavely formed inward from the crests 161 in such a way as to be repeatedly formed in the longitudinal direction thereof, thereby forming the outer peripheral surface thereof. Through the formation of the crests 161 and the roots 162, the outer peripheral surface of the elastic member 160 is bent and deformed when the stem 150 is pressurized.

According to the present invention, the elastic member 160 has a support body 163 formed on top and/or underside thereof. For example, the support body 163 is a portion of top and/or underside of the elastic member 160 bent inward from the elastic member 160. The support body 163 extends by a given length in a horizontal direction, and through the support body 163, the elastic member 160 stably comes into close contact with the underside of the second peripheral portion 152 and/or the top of the base portion of the sealing part 140.

According to the present invention, the elastic member 160 has a longer length than a stroke distance of the piston rod 130 of the pump assembly 100. The length is a length in a steady state in which the elastic member 160 is not compressed or expanded, and for example, the length has a value higher by 1.4 to 3 times than the stroke distance of the piston rod 130. However, the length may be freely set according to the material and shape of the elastic member 160, without being limited thereto. That is, the length of the elastic member 160 is determined to allow the compressed distance of the elastic member 160 to correspond to the stroke distance of the piston rod 130 or to be close thereto in consideration of the deformation caused by the repeated compression.

According to the present invention, the elastic member 160 is accommodated in the pump assembly 100 in a state of being partly compressed. To do this, the elastic member 160 has a longer length than the accommodation space (for example, the space between the stem 150 and the sealing part 140) of the pump assembly 100. For example, the elastic member 160 has a longer length by 1.3 to 3 times or 1.7 to 2.2 times than the respective accommodation spaces of the stem 150 and the sealing part 140. However, the length of the elastic member 160 may not be limited thereto. Like this, the elastic member 160 is partly compressed and thus accommodated in the pump assembly 100, and even though the elastic member 160 is deformed by the repeated compression and thus decreased in a restoration rate, it can be stably accommodated in the pump assembly 100, without any need to change the size of the accommodation space for the elastic member 160.

According to the present invention, at least a portion of the elastic member 160 is made of a soft plastic material, such as polyetheretherketone (PEEK), polycarbonate (PC), polyoxymethylene (POM), polyketone (POK), polybutylene terephthalate (PBT), polypropylene (PP), polyethylene (PE), polyoxypropylene (POP), elastomer, polyolefin elastomer (POE), copolymer, ethylene octene/butene copolymers, and the like. However, the material of the elastic member 160 is not limited thereto. Like this, the elastic member 160 is made of the soft plastic material, thereby making the elastic member 160 with ease and having a lower manufacturing cost than the conventional spring made of metal. Further, the conventional problem in which the metal spring is separated and thrown away from other components of the pump assembly is solved, so that the pump assembly 100 of the present invention is more eco-friendly.

According to the present invention, the elastic member is made by means of injection molding. Accordingly, the elastic member provides more stable performance than that made by means of blow molding.

However, the shape and configuration of the elastic member 160 are exemplary, and accordingly, various shapes and configurations of the elastic member 160 may be applied according to the embodiments of the present invention.

The housing 170 is coupled to the cylinder 110 in such a way to surround top of the cylinder 110 and thus detachably couples the pump assembly 100 to top (for example, the mouth) of the container.

The housing 170 includes accommodation portions 171-1 and 171-2, a side peripheral wall 172, and a connection portion 173 for connecting the accommodation portions 171-1 and 171-2 with the side peripheral wall 172. The accommodation portions 171-1 and 171-2 are open on tops and bottoms thereof and have hollow portions formed therein to accommodate at least portions of the stem 150 and the elastic member 160 therein. Further, the side peripheral wall is connected to the accommodation portions 171-1 and 171-2 by means of the connection portion 173, while being spaced apart from the accommodation portions 171-1 and 171-2 in an outward direction, and has a coupling portion (for example, a screw coupling portion) formed on the inner peripheral surface thereof in such a way as to be detachably coupled to the container.

According to the present invention, the accommodation portions 171-1 and 171-2 are the first accommodation portion 171-1 located above the connection portion 173 and the second accommodation portion 171-2 located under the connection portion 173.

The first accommodation portion 171-1 extends upward up to a height corresponding to the second peripheral portion 152 of the stem 150. Accordingly, the elastic member 160 is completely accommodated in the accommodation portions 171-1 and 171-2, without being exposed to the outside, thereby being prevented from being broken while the pump assembly 100 is being kept at a given place or coupled to the container.

The second accommodation portion 171-2 is inserted into the sealing part 140 and comes into close contact with the inner peripheral surface of the sealing part 140. The housing is coupled to the sealing part 140 through the second accommodation portion 171-2. To do this, the second accommodation portion 171-2 has a second coupling protrusion 174 protruding from the inner peripheral surface of the underside thereof. That is, if the second accommodation portion 171-2 is inserted into the sealing part 140, the second coupling protrusion 174 is fastened to the first coupling protrusion 144 formed on the first peripheral portion 143 of the sealing part 140, so that the housing 170 is coupled to the sealing part 140.

According to the present invention, the housing 170 simultaneously pressurizes the first wing 111 of the cylinder 110 and the second wing 141 of the sealing part 140 against the inner surface thereof and thus fixes them to top of the container. For example, if the housing 170 is coupled to top of the container, the underside of the connection portion 173 pressurizes both of the top of the first wing 111 and the top of the second wing 141 downward, so that the first wing and the second wing 141 are fixed between top of the container and the housing 170.

Figure 8:
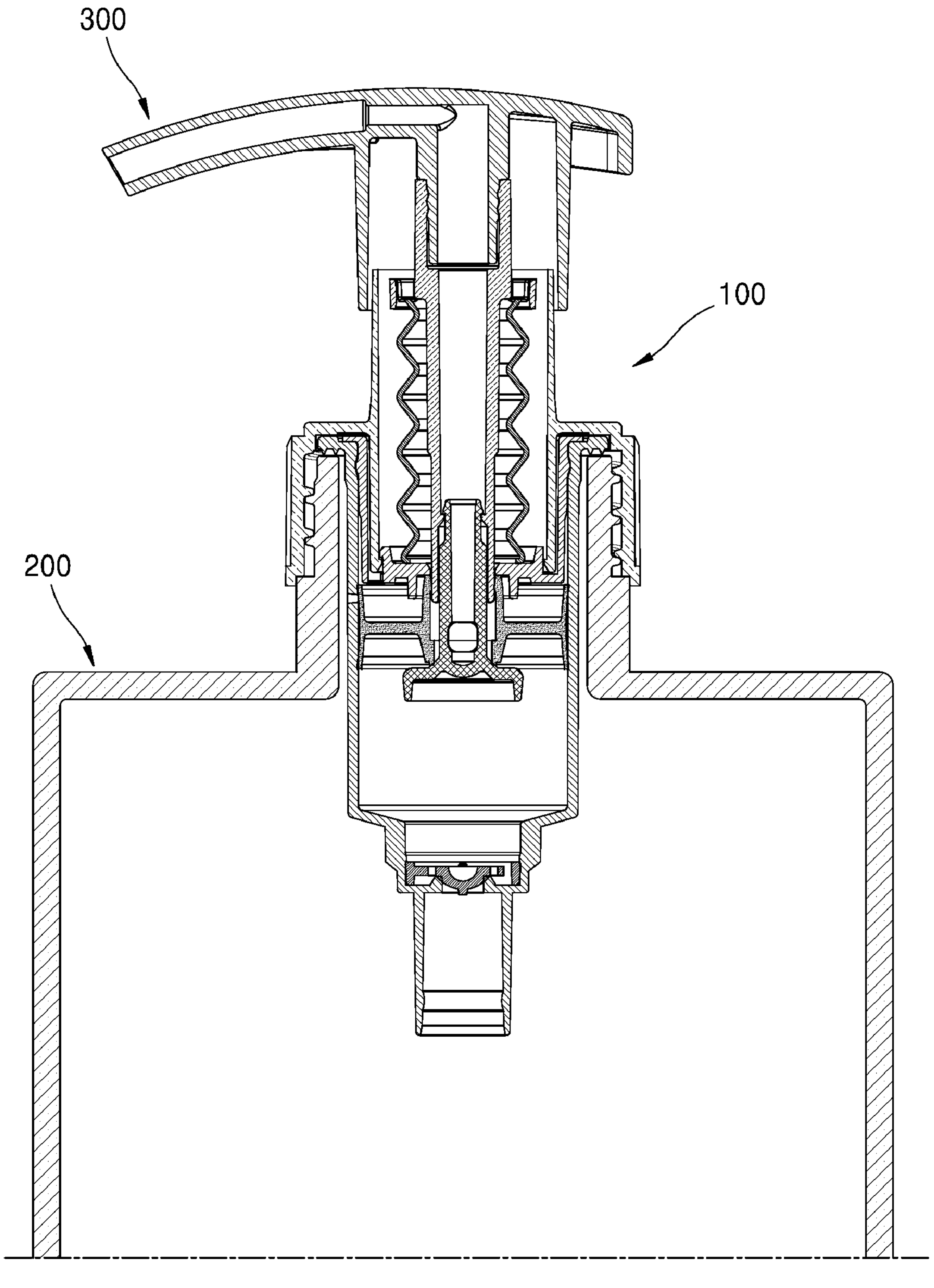
FIG. 8 is a sectional view showing a container to which the pump assembly according to the present invention is coupled.

FIG. 8 is a sectional view showing a container to which the pump assembly according to the present invention is coupled.

Referring to FIG. 8, the container includes the pump assembly 100, a container body 200, and a nozzle 300.

The container body 200 provides an accommodation space in which the contents of the container are accommodated. The contents are discharged to the outside by means of the nozzle and thus applied to the user's given region. In this case, the contents are cosmetics (cosmetic materials) or medicines, but they may have various formulation such as liquid, gel, powder, and the like in such a way as to be accommodated in the container body 200 and discharged through the nozzle 300, without being limited thereto. Further, the container body 200 has the shape of a bottle, which is just exemplary, and accordingly, the container body 200 may have various shapes such as a tube, a tottle, and the like.

The pump assembly 100 (e.g., the first wing 111 of the cylinder 110) is seated onto top of the container body 200. The contents of the container body 200 are discharged to the outside by means of the pump assembly 100. The housing 170 of the pump assembly 100 is coupled to the outer peripheral surface of the mouth of the container body 200. If the container body 200 and the housing 170 are coupled to each other, the housing 170 pressurizes the first wing 111 of the cylinder 110 and the second wing 141 of the sealing part 140 and fixes them to top of the container body 200.

The nozzle 300 receives the external force from the user, transfers it to the pump assembly 100, and discharges the contents of the container body 200 from the pump assembly 100 to the outside. The nozzle 300 receives the external force from the user through top thereof and thus moves up and down, and the underside of the nozzle 300 comes into contact with the piston rod 130. The ascending and descending operations of the nozzle 300 cause the ascending and descending operations of the piston rod 130.

As mentioned above, the preferred embodiment of the present invention has been disclosed in the specification and drawings. In the description of the present invention, special terms are used not to limit the present invention and the scope of the present invention as defined in claims, but just to explain the present invention. Therefore, persons skilled in the relevant art can appreciate that many modifications and variations are possible in light of the above teachings. It is therefore intended that the scope of the invention be limited not by this detailed description, but rather by the claims appended hereto.

The invention claimed is:

1. A pump assembly comprising:

a cylinder having a top and a bottom that is open and a hollow portion formed therein, wherein the top of the cylinder has a first wing protruding in an outward direction from an outer peripheral surface thereof;

a sealing part having at least a portion thereof inserted into the cylinder and at least partly sealing an upper portion of the cylinder, wherein a top of the sealing part has a second wing protruding in the outward direction from an outer peripheral surface thereof;

a stem configured to move downward in reply to an external force to vary internal pressure of the cylinder;

an elastic member disposed between the stem and the sealing part and configured to apply an elastic force to the stem from the sealing part; and a housing coupled to the cylinder and surrounding a top of the cylinder, wherein the housing is configured to detachably couple the pump assembly to a container, the housing comprising:

at least one accommodation portion having a top and a bottom that is open and a hollow portion formed therein to accommodate at least portions of the stem and the elastic member therein, wherein the at least one accommodation portion includes a first accommodation portion and a second accommodation portion;

a side peripheral wall disposed spaced apart from the at least one accommodation portion in the outward direction and having a coupling portion formed on an inner peripheral surface of the side peripheral wall, wherein the coupling portion is configured to detachably couple to the container; and a connection portion extending in the outward direction from an outer peripheral surface of the at least one accommodation portion to connect the side peripheral wall and the at least one accommodation portion, wherein the at least one accommodation portion is inserted into the sealing part by a given depth to couple the housing to the sealing part, and wherein when the housing is coupled to the container, the first wing and the second wing are pressurized downward by an inner surface of the housing and is configured to be fixed to a top of the container.

2. The pump assembly according to claim 1, wherein the cylinder has a seating groove formed on an inner periphery of the top thereof to accommodate the second wing therein and a top of the first wing is aligned in height with a top of the second wing.

3. The pump assembly according to claim 1, wherein the sealing part has a first peripheral portion protruding upward from an underside of an inside thereof and a first coupling protrusion protruding from an outer peripheral surface of the first peripheral portion, wherein the housing has a second coupling protrusion protruding from an inner peripheral surface of an underside of the at least one accommodation portion, and wherein when the at least one accommodation portion is inserted into the sealing part, the first coupling protrusion is fastened to the second coupling protrusion.

4. The pump assembly according to claim 3, wherein the sealing part has at least one or more air inlet holes formed on the underside of the inside thereof at a position located in the outward direction of the first peripheral portion, and the at least one or more air inlet holes communicate with an interior of the cylinder.

5. The pump assembly according to claim 1, wherein the elastic member is a bellows type member having an open top and is closed on side peripheral surfaces thereof, wherein the stem has a second peripheral portion protruding in the outward direction from an outer peripheral surface of an upper portion thereof to support a top of the elastic member, and wherein the second peripheral portion has at least one or more air entrance holes formed thereon and communicating with the open top of the elastic member.

6. The pump assembly according to claim 5, wherein the second peripheral portion has a downward extending portion protruding in a downward direction from an outer periphery thereof to prevent the top of the elastic member from being deformed in the outward direction.

7. The pump assembly according to claim 5, wherein the at least one accommodation portion extends in an upward direction up to at least a height corresponding to the second peripheral portion to accommodate the elastic member therein, and the elastic member is not exposed to an outside of the pump assembly.

8. The pump assembly according to claim 5, wherein the elastic member is made of at least one selected from polyetheretherketone (PEEK), polycarbonate (PC), polyoxymethylene (POM), polyketone (POK), polybutylene terephthalate (PBT), polypropylene (PP), polyethylene (PE), polyoxypropylene (POP), elastomer, polyolefin elastomer (POE), copolymer, and ethylene octene/butene copolymers.

* * * * *